(12) United States Patent
Chen et al.

(10) Patent No.: US 9,910,571 B2
(45) Date of Patent: Mar. 6, 2018

(54) APPLICATION SWITCHING AND MULTITASKING

(71) Applicant: Google Inc., Mountain View, CA (US)

(72) Inventors: Jennifer Shien-Ming Chen, San Francisco, CA (US); Alexander Friedrich Kuscher, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 427 days.

(21) Appl. No.: 14/611,068

(22) Filed: Jan. 30, 2015

(65) Prior Publication Data
US 2016/0224213 A1   Aug. 4, 2016

(51) Int. Cl.
*G06F 15/00* (2006.01)
*G06F 13/00* (2006.01)
*G06F 3/0484* (2013.01)
*G06F 3/0488* (2013.01)
*G06F 3/0482* (2013.01)

(52) U.S. Cl.
CPC ........ *G06F 3/04842* (2013.01); *G06F 3/0482* (2013.01); *G06F 3/0488* (2013.01)

(58) Field of Classification Search
CPC ................................ G06F 3/0484; G09G 5/00
USPC .................. 715/719, 799, 790, 803, 788
See application file for complete search history.

(56) References Cited

U.S. PATENT DOCUMENTS

| | | | |
|---|---|---|---|
| 8,243,911 B1* | 8/2012 | Abidogun | H04L 45/28 379/221.03 |
| 9,658,062 B2* | 5/2017 | Duff | G01B 11/275 |
| 2013/0227472 A1* | 8/2013 | Sosinski | G06F 3/0481 715/794 |
| 2015/0067601 A1* | 3/2015 | Bernstein | G06F 3/0488 715/823 |
| 2015/0370323 A1* | 12/2015 | Cieplinski | G06F 3/013 345/156 |

* cited by examiner

*Primary Examiner* — Kevin Nguyen
(74) *Attorney, Agent, or Firm* — McDermott Will & Emery LLP

(57) ABSTRACT

Displaying windows on a computing device includes displaying a first window on a display of a computing device. First user input corresponding to a drag gesture from a first edge of the display inward and away from the first edge is received. In response to the received first user input, a second window is displayed concurrent with display of the first window. Second user input corresponding to a swipe gesture from a second edge of the display inward and away from the second edge is received. In response to the received second user input, a third window is displayed that replaces the concurrent display of the first and second windows. A state of the concurrent display of the first and second windows is stored for subsequent concurrent display of the first and second windows.

20 Claims, 10 Drawing Sheets

APPLICATION SWITCHING AND MULTITASKING

BACKGROUND

World-wide application of hand-held communication devices such as smart phones, tablets, and phablets are ever increasing, and features of these devices are improving in a very fast pace. Oftentimes, devices of a new generation of a hand-held communication device, in spite of offering enhanced features such as more processing power, faster, more power efficiency, and other desirable features, are more compact and cost efficient. The new generations are also expected to be smarter, for example, by fully leveraging various existing hardware and/or software to include more user-friendly features that allows more efficient use of available resources for accessing information.

SUMMARY

The disclosed subject matter relates to a computer-implemented method for displaying windows on a computing device. The method comprises displaying a first window on a display of a computing device, and receiving first user input corresponding to a drag gesture from a first edge of the display inward and away from the first edge. The method further comprises displaying, in response to the received first user input, a second window on the display concurrent with display of the first window, and receiving second user input corresponding to a swipe gesture from a second edge of the display inward and away from the second edge. The method further comprises displaying, in response to the received second user input, a third window that replaces the concurrent display of the first and second windows, and storing a state of the concurrent display of the first and second windows for subsequent display.

The disclosed subject matter further relates to a computing device for displaying windows within a user interface. The computing device comprises a display, one or more processors, and a machine-readable medium comprising instructions stored therein, which when executed by the processors, cause the processors to perform operations comprising displaying a first window on the display of the computing device. The operations further comprise receiving first user input corresponding to a drag gesture from a first edge of the display inward and away from the first edge, and displaying, in response to the received first user input, a second window on the display concurrent with display of the first window. The operations further comprise receiving second user input corresponding to a swipe gesture from a second edge of the display inward and away from the second edge, and displaying, in response to the received second user input, a third window that replaces the concurrent display of the first and second windows. The operations further comprise storing a state of the concurrent display of the first and second windows for subsequent display, and receiving third user input corresponding to a swipe gesture from an edge opposite the second edge of the display inward and away from the opposite edge. The operations further comprise providing, in response to the received third user input and based on the stored state, for the concurrent display of the first and second windows, wherein the concurrent display replaces the display of the third window.

The disclosed subject matter further relates to a machine-readable medium comprising instructions stored therein, which when executed by a system, cause the system to perform operations comprising displaying a first window on a display of a computing device. The operations further comprise receiving first user input corresponding to a drag gesture from a first edge of the display inward and away from the first edge, and displaying, in response to the received first user input, a second window on the display concurrent with display of the first window. The operations further comprise receiving second user input corresponding to a swipe gesture from a second edge of the display inward and away from the second edge, and displaying, in response to the received second user input, a third window that replaces the concurrent display of the first and second windows. The operations further comprise receiving third user input corresponding to a swipe gesture from the second edge of the display inward and away from the second edge, and providing, in response to the received third user input, for the concurrent display of the first and second windows, wherein the concurrent display replaces the display of the third window.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In one or more implementations of the subject technology, a computing device may perform multitasking by switching between two or more windows based on one or more user interactions with the computing device. A first window is displayed on a display of the computing device. First user input corresponding to a drag gesture from a first edge of the display inward and away from the first edge is received. In response to the received first user input, a second window is displayed concurrent with display of the first window. Second user input corresponding to a swipe gesture from a second edge of the display inward and away from the second edge is received. In response to the received second user input, a third window is displayed that replaces the concurrent display of the first and second windows. A state of the concurrent display of the first and second windows is stored for subsequent concurrent display of the first and second windows.

As described herein, according to example aspects, a "drag" gesture (e.g., by a finger) may be slower and more precise than a "swipe" gesture. A drag gesture may include one or more pauses while the finger remains on the screen, and a screen of the computing device may continue responding while the finger remains on the screen. In addition, the screen of the computing device may stop responding when the finger is picked up for a drag gesture. On the other hand, a "swipe" gesture may be quicker than a drag gesture, and may affect the screen of the computing device even after the finger is picked up. The respective speeds for drag and swipe gestures may be stored in memory and accessible by a processor.

Figure 1:
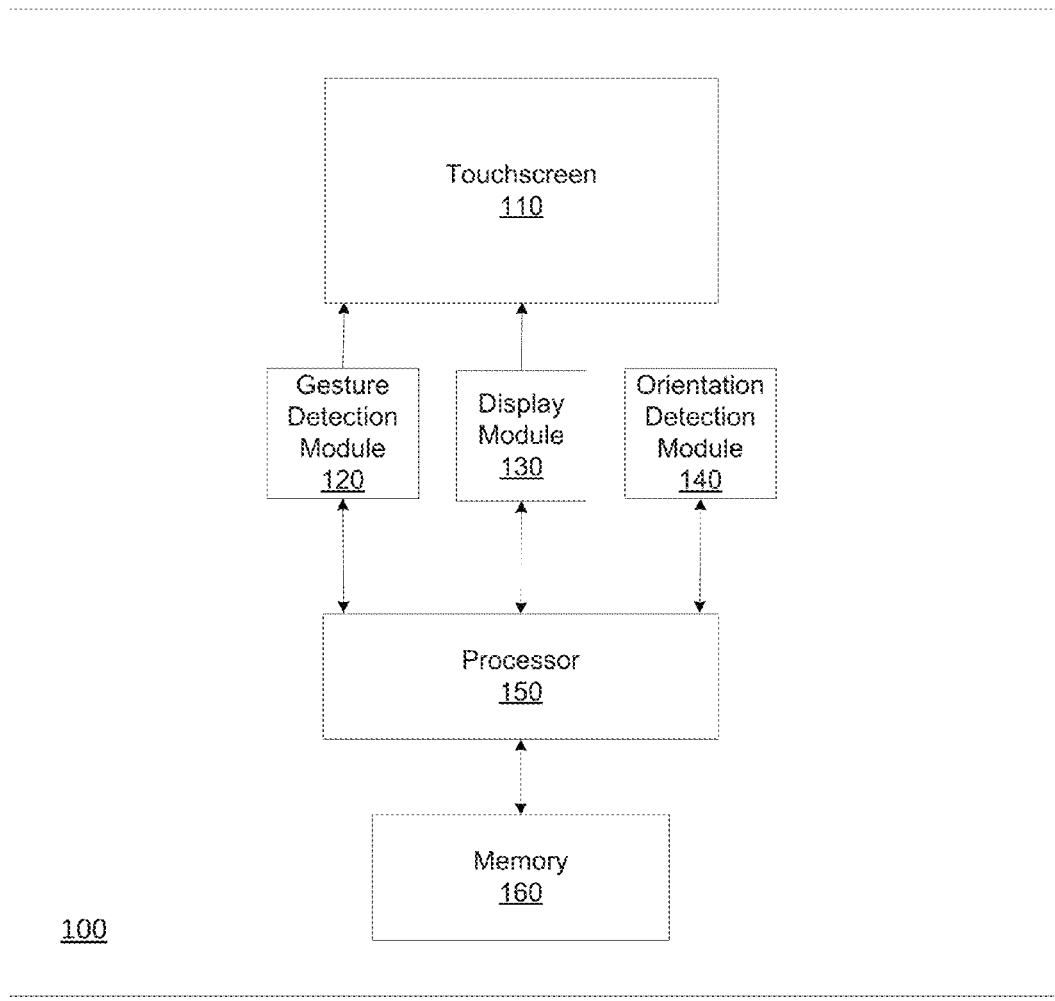
FIG. 1 is a conceptual diagram illustrating an example of a computing device with application switching and multitasking capabilities, in accordance with one or more aspects of the subject technology.

FIG. 1 is a conceptual diagram illustrating an example of a computing device with application switching and multitasking capabilities, in accordance with one or more aspects of the subject technology. Examples of the computing device 100 include a tablet, a phablet, a smart phone, a laptop, or any other touch-screen computing.

The computing device 100 may include, but is not limited to, a touchscreen 110, a gesture detection module 120, a display module 130, an orientation detection module 140, a processor 150, and a memory 160. In one or more implementations, the gesture detection module 120, the display module 130 and/or the orientation detection module 140 may be implemented in hardware, firmware, or software or a combination thereof. The software can be stored in memory 160 or other memory of the computing device 100 and can be executed by the processor 150. Examples of the memory 160 may include a Random Access Memory (RAM), a flash memory, a Read Only Memory (ROM), a Programmable Read-Only Memory (PROM), an Erasable PROM (EPROM), registers, or other type of memory. Examples of the processor 150 may include a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

In one or more implementations of the subject technology, the computing device 100 may perform multitasking by switching between two or more windows based on one or more user interactions with the computing device. Examples of the windows include, but are not limited to, a canvas of an application such as a web browser, a word processing application, a slide show application, a spread sheet, a game, a media-player application, or any other application that is executable on a computing device.

Display module 130 may display a first window (e.g., in full-screen mode) on touchscreen 110 of the computing device 100. Touchscreen 110 may receive first user input from a first edge of touchscreen 110 inward and away from (e.g., orthogonal to) the first edge. Gesture detection module 120 may detect that the first user input is a drag gesture (e.g., which may include a pause in the middle of the display). In response to the received first user input and detected drag gesture, processor 150 may instruct display module 130 to display a second window concurrent with display of the first window on touchscreen 110 (e.g., in a split screen mode).

Touchscreen 110 may receive second user input from a second edge of touchscreen 110 inward and away from the second edge. Gesture detection module 120 may detect that the second user input is a swipe gesture. In response to the received second user input and detected swipe gesture, processor 150 may instruct display module 130 to display a third window on touchscreen 110 that replaces the concurrent display of the first and second windows. Processor 150 may also store a state of the concurrent display of the first and second windows in memory 160, for subsequent concurrent display of the first and second windows on touchscreen 110.

For example, touchscreen 110 may receive third user input corresponding to a swipe gesture from an edge (e.g., an edge opposite the second edge) of the display inward and away from that edge, and gesture detection module 120 may detect such third user input. In response to the received third user input and based on the stored state (e.g., of the concurrent display), processor 150 may instruct display module 130 to provide again for the concurrent display of the first and second windows, to replace the display of the third window.

In example aspects, while the first window is displayed in full-screen mode on touchscreen, gesture detection module 120 may detect user input of a swipe gesture (as opposed to a drag gesture) from the first edge of touchscreen 110 inward and away from the first edge. In response to the received first user input and detected swipe gesture, processor 150 may instruct display module 130 to display the second window on the screen in full-screen mode, rather than concurrently displaying the second window with the first window (e.g., as is for a drag gesture).

The processor 150 in conjunction with gesture detection module 120 may use a touch history of the pixels of the touchscreen 110 to identify the swipe gesture as being initiated from an edge of the touchscreen 110 or as one of a swipe gesture or a drag gesture. In this regard, the processor 150 may make time records of the sensed touch input in a chronological order, for example, in the memory 160. The processor 150 may create the touch history of the pixels of the touchscreen 110 by using the time records made in the memory 160. For instance, when the swipe gesture starts from an edge of the touchscreen 110, the touch history indicates that the first touched pixels were among the one or more pixels closet to an edge (e.g., a side, top, or bottom) of the touchscreen 110. For a drag gesture, for example, the touch history shows a series of pixels from and edge to the vicinity of the centerline (e.g., horizontal or vertical centerline) of the touchscreen 110 were touched sequentially. While for a swipe gesture, the touched pixels are indicated to be initiated from one edge and continue to pass the centerline of the touchscreen 110. Respective speeds for drag gestures and swipe gestures may also be stored in memory 160 for detection of drag and swipe gestures.

In example aspects, touchscreen 110 may receive user input corresponding to a swipe gesture from a bottom edge of the display inward and away from the bottom edge, and gesture detection module may detect such third user input. In response to the received user input, processor 150 may instruct display module 140 to display an overview of applications (e.g., in a mosaic view) that are active on the computing device on touchscreen 110.

In example aspects, orientation detection module 140 may be configured to detect an orientation of computing device 100, for example, using a gyroscope included within or otherwise coupled to computing device 100. Orientation detection module 140 may detect that computing device 100 is in a vertical position when concurrently displaying the first and second windows. In response to detecting the vertical orientation, processor 150 may instruct display module 130 to display the first and second windows in a top and bottom configuration, and to display each of the first and second windows in a landscape view.

Alternatively or in addition, orientation detection module 140 may detect that computing device 100 is in a horizontal position when concurrently displaying the first and second windows. In response to detecting the horizontal orientation, processor 150 may instruct display module 130 to display the first and second windows in a left and right (e.g., side-by-side) configuration, and to display the first and second windows being in a portrait view.

In example aspects, a divider element (e.g., a solid bar) may be displayed on the touchscreen 110 between the concurrent display of the first and the second windows. Gesture detection module 120 may be configured to detect a signal corresponding to a drag of the divider element. In some aspects, in response to detecting by the gesture detection module 130 that the drag of the divider element is towards the first or the second window, the display module 130 may take the first or the second window off the screen, respectively. More detailed explanation of the transition between application windows is described below.

Figure 2A:
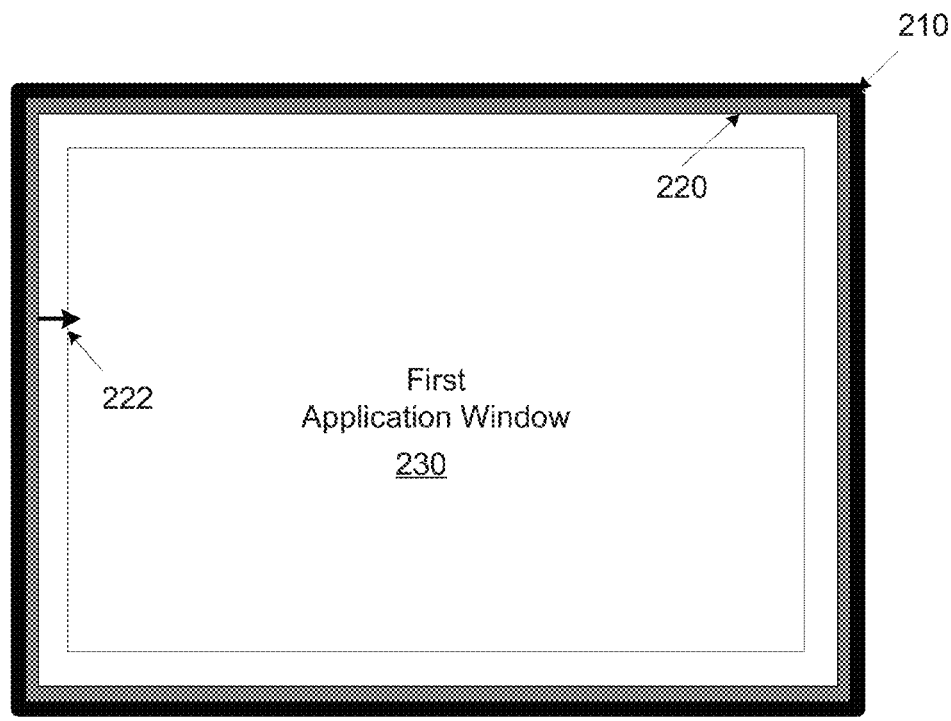
FIGS. 2A-2B are high-level diagrams illustrating an example of switching between two application windows responsive to a swipe gesture, in accordance with one or more aspects of the subject technology.
Figure 2B:
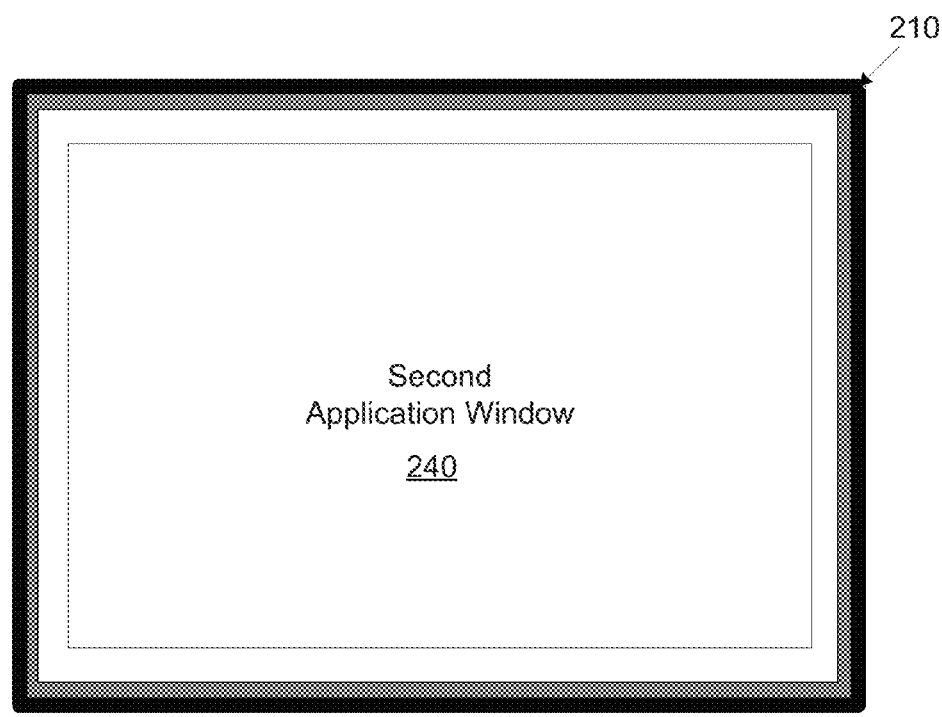

FIGS. 2A-2B are high-level diagrams illustrating an example of switching between two application windows responsive to a swipe gesture, in accordance with one or more aspects of the subject technology. The touchscreen 210 shown in FIG. 2A is a touchscreen of the computing device 100 of FIG. 1 (e.g., similar to 110 of FIG. 1) and includes an edge region 220 around the edges of the touchscreen 210 that may include a few (e.g., one or two or more) reserved pixels for detection of an edge swipe gesture. In some aspects, the reserved pixels of the edge region 220 may be dark pixels that are used for detecting that a swipe was actually an edge swipe. In other words, any edge swipe gesture starts from the edge region 220 and is detected by the gesture detection module 120 of FIG. 1 by signals from the pixels of the edge region 220. In the example shown in FIG. 2A, the touchscreen 210 is displaying a first window (e.g., application window) 230, when the touchscreen 110 receives touch input that gesture detection module 120 in conjunction with processor 150 identifies (e.g., based on touch history) as being associated with a swipe gesture from the left side, as designated by the arrow 222. In response to the swipe gesture 222, processor 150 may instruct the display module 130 to switch to displaying a second window (e.g., application window) 240 in full-screen mode, to replace the first window 230, as shown in FIG. 2B.

The second application window 240 may be the next most recently used application window of the active application windows in a list of active application windows stored in an application window history (e.g., in the memory 160 of FIG. 1). In example aspects, a user may cycle through all active applications by continuously performing swipe gestures (e.g., 222) from the edge (e.g., 220) of the display. The user may cycle through the applications based on swipes which are in quick succession, for example, less than a threshold amount of time between swipes. Alternatively or in addition, the user may toggle between the last two applications most recently accessed (rather than cycling through all active applications) by continuously performing swipe gestures from the edge, if the swipes are not in quick succession (e.g., greater than or equal to the threshold amount of time between swipes).

In example aspects, processor 150 in conjunction with display module 130 may present the active applications as a stack of windows, with the currently displayed window being on top of the stack (e.g., and covering or overlaying the other windows). As the active windows are cycled or toggled through, display module 130 provides a visual effect that simulates the top window as sliding off the top of the stack. Furthermore, the mode of display (e.g., landscape) of the touchscreen 210 may stay the same as the second application window 240 is displayed.

Figure 3A:
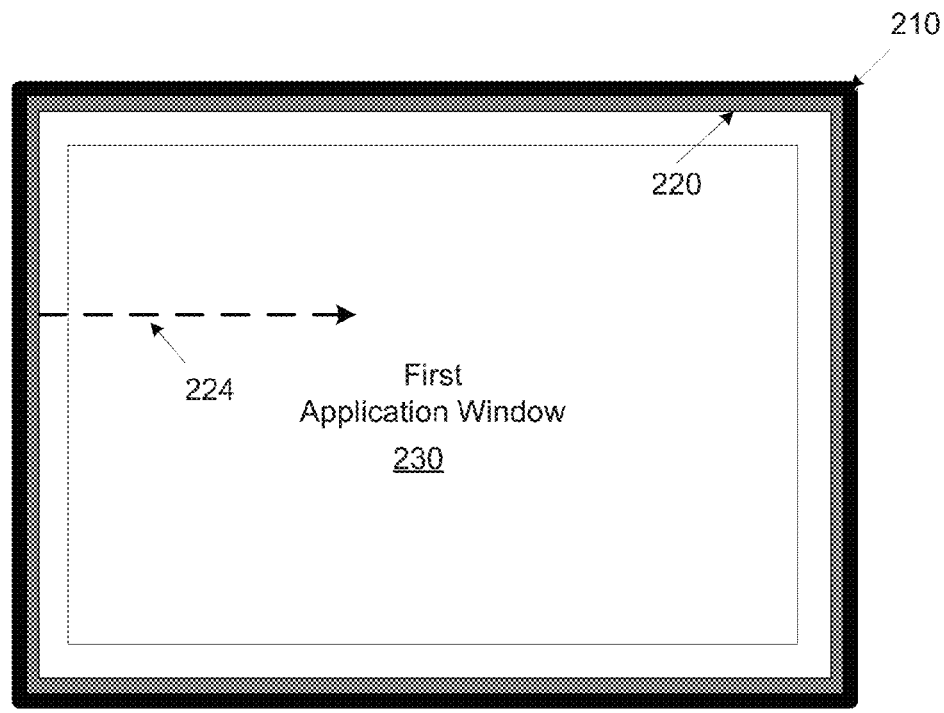
FIGS. 3A-3B are high-level diagrams illustrating an example of concurrently displaying two application windows responsive to a drag gesture, in accordance with one or more aspects of the subject technology.
Figure 3B:
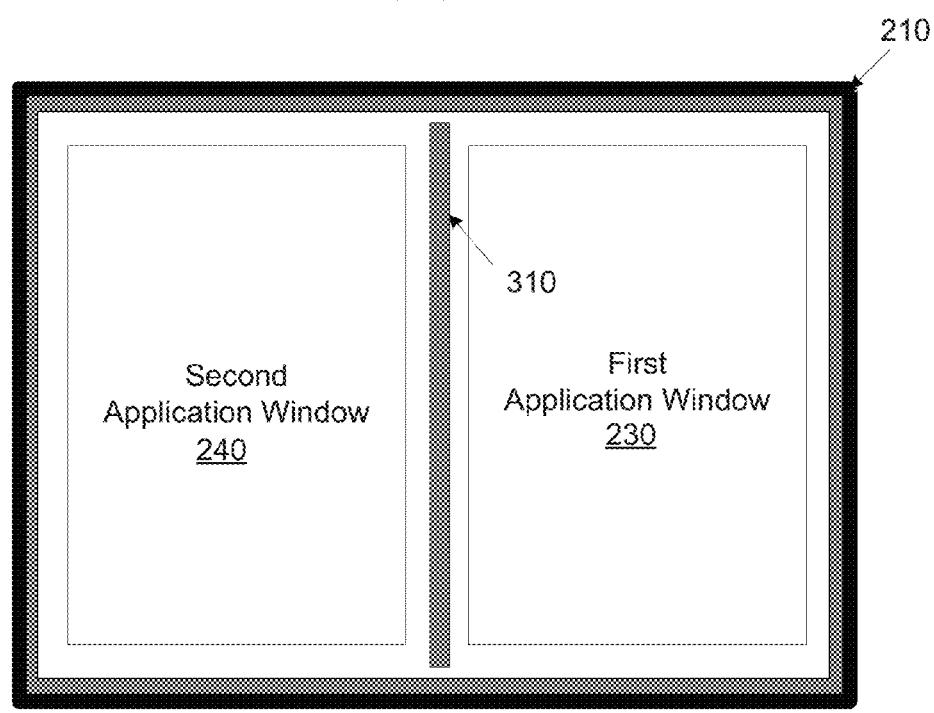

FIGS. 3A-3B are high-level diagrams illustrating an example of concurrently displaying two application windows responsive to a drag gesture, in accordance with one or more aspects of the subject technology. FIG. 3A shows the touchscreen 210 and the edge region 220 while displaying the first application window 230. Touchscreen 110 may receive touch input that gesture detection module 120, in conjunction with processor 150, identifies as being associated with a drag gesture from the left side, as designated by the dotted arrow 224. In response to the drag gesture 224, the display module 130 may display the first and second application windows 230 and 240 concurrently (e.g., side-by-side), as shown in FIG. 3B. As noted above, the drag gesture may include one or more pauses by the user (e.g., a mid-screen pause).

Because the drag gesture 224 was initiated from a left side of the touchscreen 210, the second application window 240 is displayed on the left-hand side of the first application window 230, which was already being displayed (FIG. 3A).

In one or more implementations, if the drag gesture is performed from the right side of the touchscreen 210, the display module 130 may display the second application window on the right-hand side of the first application window 230. In example aspects, as seen in FIG. 3B, when the orientation of the device is horizontal (e.g. as detected by orientation detection module 140), the first and second application windows 230 and 240 are concurrently displayed side-by-side, each in a portrait view.

In example aspects, processor 150 in conjunction with display module 130 may provide for the content of both the first window and the second window to be scaled to fit within the concurrent display. For example, all of the content displayed within first application window 230 in FIG. 3A can be retained when first application window is displayed within FIG. 3B, by resizing the content so as to fit within the reduced window size in FIG. 3B. Likewise, all of the content displayed within the second application window 240 (e.g., as shown in FIG. 2B) can be sized to fit within the reduced window size of second window 240 in FIG. 3B. Thus, it is not necessary to crop content for windows while they are concurrently displayed.

In some implementations, a divider 310 (e.g., a vertical divider, such as a vertical solid bar) may be displayed between the first and second application windows 230 and 240. In some aspects, the divider 310 may have a different fill pattern or color than the solid bar shown in FIG. 3B. The user may drag the divider 310 in both left and right directions as explained below.

Figure 4A:
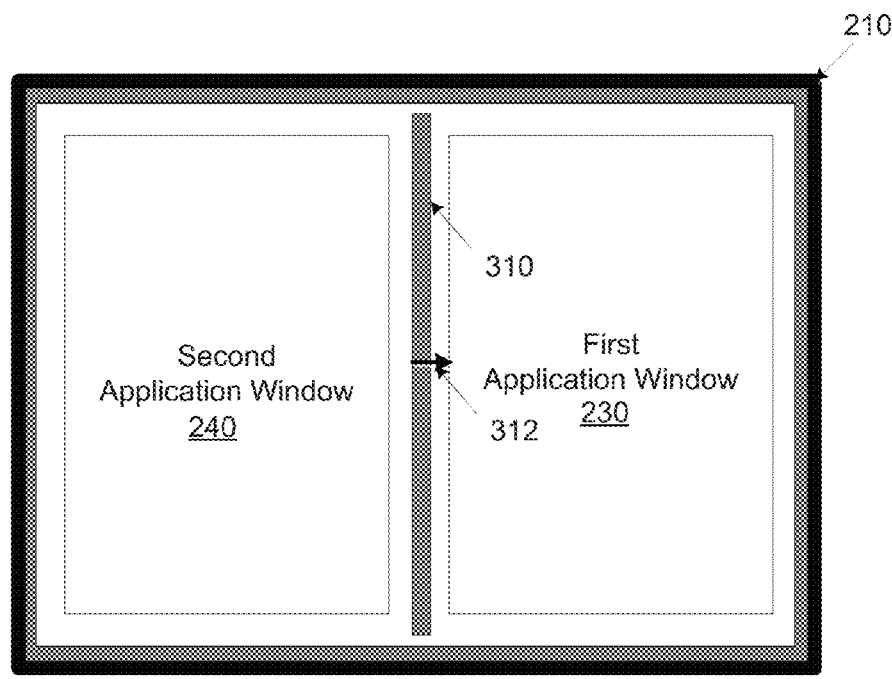
FIGS. 4A-4B are high-level diagrams illustrating an example of removing one application window from the concurrent display of two application windows responsive to a drag gesture, in accordance with one or more aspects of the subject technology.
Figure 4B:
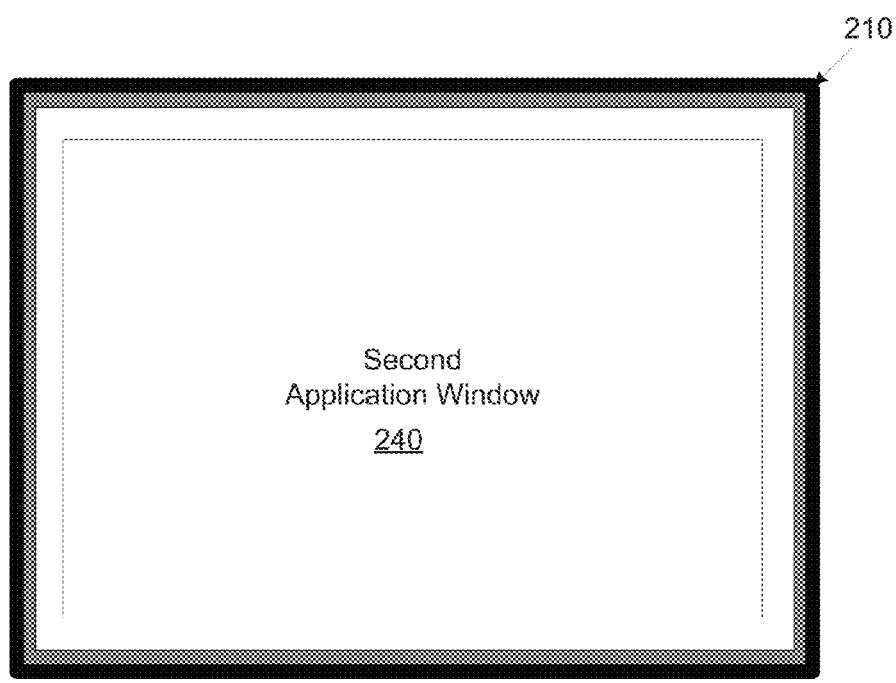

FIGS. 4A-4B are high-level diagrams illustrating an example of removing one application window from the concurrent display of two application windows responsive to a drag gesture, in accordance with one or more aspects of the subject technology. The touchscreen 210 of FIG. 4A is concurrently displaying the first and second application windows 230 and 240 side-by-side. While displaying the first and second application windows 230 and 240 side-by-side, a user drag gesture as designated by an arrow 312 is detected by the gesture detection module 120.

In response to the detection, the processor 150 of FIG. 1 may cause the display module 130 to remove display of the first application window 230 from the touchscreen 210, so that only display of the second application window remains, as depicted in FIG. 4B. In example aspects, the second window is displayed in landscape view. In one or more implementations, if the drag gesture was detected to be in the left direction, the second application window 240, which is being displayed on the left-hand side of the divider 310, would be taken off and only the first application window 230 would be displayed (e.g., in landscape view) on the touchscreen 210.

Figure 5A:
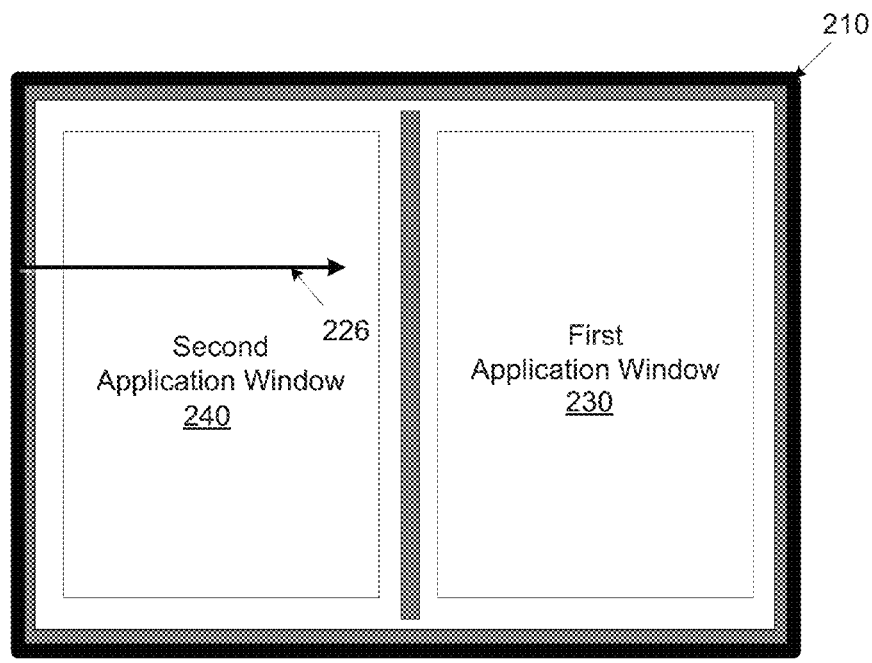
FIGS. 5A-5B are high-level diagrams illustrating an example of replacing the concurrent display of two application windows with a next application window in response to a swipe gesture, in accordance with one or more aspects of the subject technology.
Figure 5B:
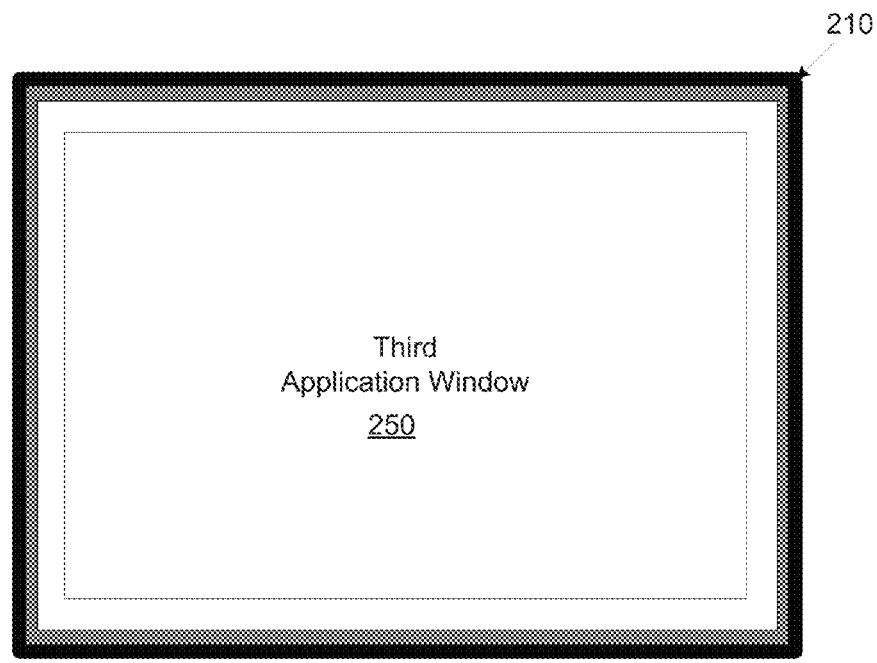

FIGS. 5A-5B are high-level diagrams illustrating an example of replacing the concurrent display of two application windows with a next application window in response to a swipe gesture, in accordance with one or more aspects of the subject technology. FIG. 5A shows the touchscreen 210 while concurrently displaying the first application window 230 and the second application window 240 side-by-side. Touchscreen 110 may receive touch input that gesture detection module 120, in conjunction with processor 150, identifies as being associated with a swipe gesture from the left side, as designated by the arrow 226. In response to the swipe gesture 226, the display module 130 may replace the concurrent display of the first and second application windows 230 and 240 with a third window (e.g., application window) 250, as shown in FIG. 5B. The third application window 250 may be an active application window that is next (e.g., next most recently used) to the second application window 240, in the list of applications in the application window history. The third application window 250 may be displayed in the landscape view.

Processor 150 may also store a state of the concurrent display of the first and second windows in memory 160, for subsequent concurrent display of the first and second windows on touchscreen 110. The state of the concurrent display may correspond to a stored indication (e.g., value in memory 160) that the first and second windows are to be presented within the same screen, in a case where the user returns back to the first or second application when cycling through applications or toggling between applications. Thus, rather than presenting the first and second windows as separate screens when the user performs subsequent swipe gestures (e.g., to cycle through or toggle between applications as described above with reference to FIGS. 2A-2B), the saved state provides for retaining the concurrent display of the first and second applications on a single screen.

Figure 6A:
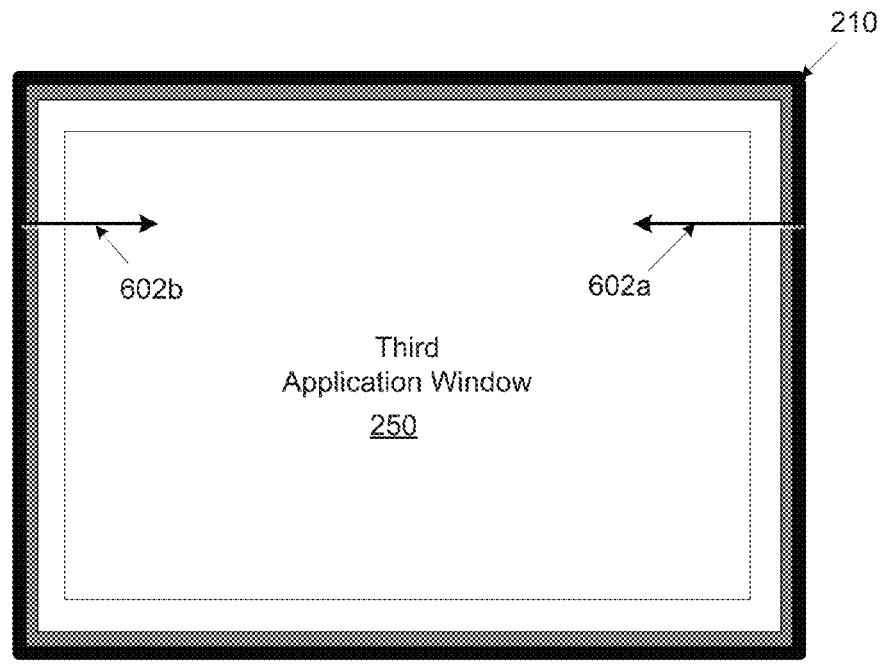
FIGS. 6A-6B are high-level diagrams illustrating an example of replacing the display of an application window with a stored state of the concurrent display of two application windows in response to a swipe gesture, in accordance with one or more aspects of the subject technology.
Figure 6B:
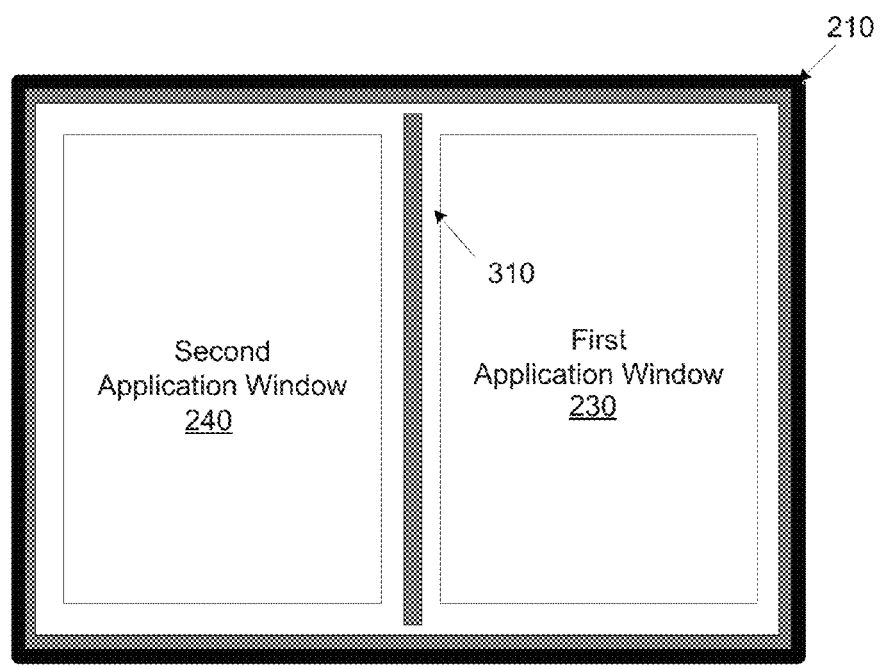

FIGS. 6A-6B are high-level diagrams illustrating an example of replacing the display of an application window with a stored state of the concurrent display of two application windows in response to a swipe gesture, in accordance with one or more aspects of the subject technology. FIG. 6A shows the touchscreen 210 while displaying the third application window 250. Touchscreen 110 may receive touch input that gesture detection module 120, in conjunction with processor 150, identifies as being associated with a swipe gesture from the right side, as designated by arrow 602a. In response to the swipe gesture 602a, processor 150 may instruct the display module 160 to redisplay the first and second application windows 230 and 240 concurrently (e.g., side-by-side), as shown in FIG. 6B. As noted above, the state of concurrent display was saved in memory 160 by processor 150.

In example aspects, arrow 602b illustrates touch input corresponding to a swipe gesture from the left side. In response to the swipe gesture 602b, processor 150 may instruct the display module 160 to redisplay the first and second application windows 260 and 240 concurrently (e.g., side-by-side), as shown in FIG. 6B (e.g., if the left edge is used to toggle between the most recent applications). Alternatively, in response to the swipe gesture 602b, processor 150 may instruct the display module 160 to display a next window in full-screen mode (e.g., a fourth application window).

In some implementations, the divider 310 (e.g., a vertical divider, such as a vertical solid bar) may be displayed between the first and second application windows 230 and 240. In some aspects, the divider 310 may have a different fill pattern or color than the solid bar shown in FIG. 6B. The user may drag the divider 310 in both left and right directions as explained above with reference to FIGS. 4A-4B.

Figure 7A:
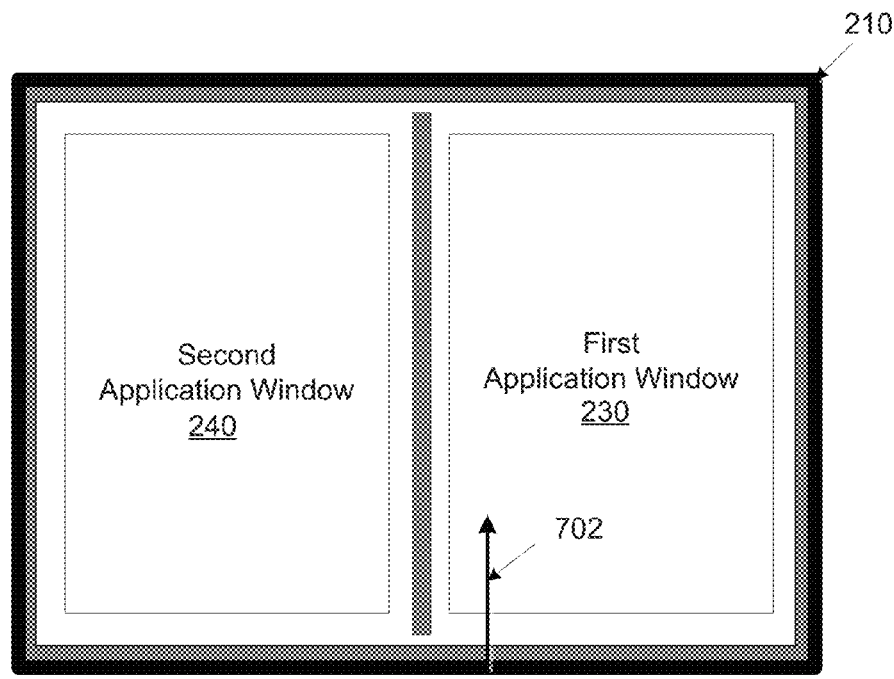
FIGS. 7A-7B are high-level diagrams illustrating an example of displaying an overview of active applications in response to a swipe gesture, in accordance with one or more aspects of the subject technology.
Figure 7B:
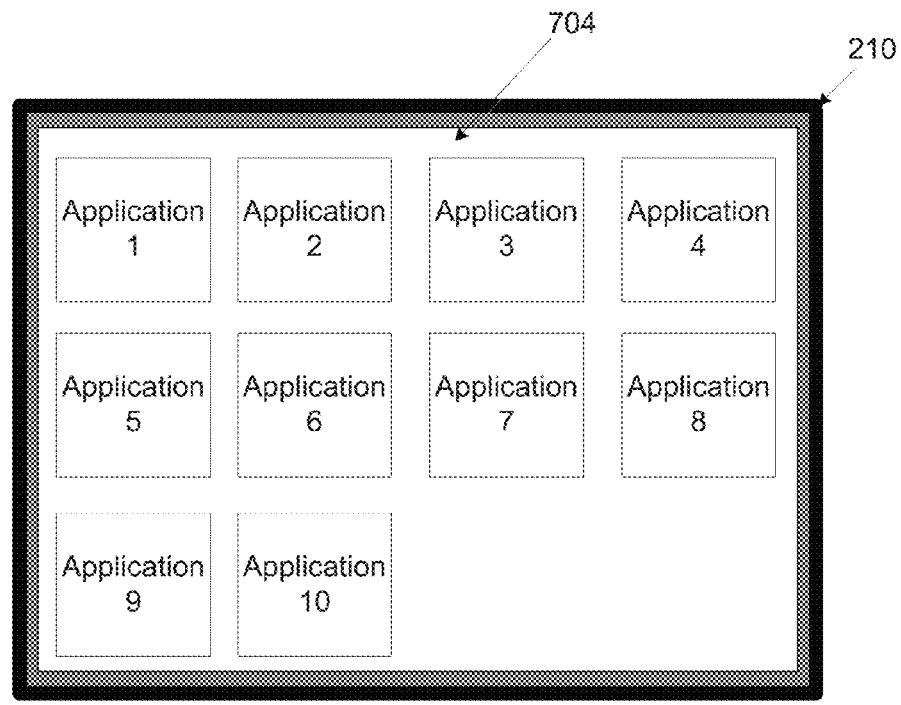

FIGS. 7A-7B are high-level diagrams illustrating an example of displaying an overview of active applications in response to a swipe gesture, in accordance with one or more aspects of the subject technology. FIG. 7A shows the touchscreen 210 while concurrently displaying the first application window 230 and the second application window 240 side-by-side. Touchscreen 110 may receive touch input that gesture detection module 120, in conjunction with processor 170, identifies as being associated with a swipe (or drag) gesture from the bottom edge, as designated by the arrow 702. In response to the swipe (or drag) gesture 702, the display module 130 may replace the concurrent display of the first and second application windows 230 and 240 with an overview 702 of all active applications, as shown in FIG. 7B.

In the example of FIG. 7B, applications 1-10 correspond to all applications that are active on computing device 100. For example, "application 1" corresponds to the first application window 230, "application 2" corresponds to the second application window 240, and "application 3" corresponds to the third application window 250. Each of remaining applications 4-10 can correspond with additional respective application windows that may be cycled/toggled through and/or displayed in full-screen or split-screen mode, via swipe or drag gesture, as described above. Overview 704 can be presented as a mosaic of icons representing the applications, or can be presented in other arrangements (e.g., stacked icons, cascading icons, etc.)

While the example of FIG. 7A illustrates that overview 704 is displayed in response to a swipe gesture from the bottom edge of a screen with concurrent windows 230 and 240 (e.g., split screen mode), it should be noted that display of overview 704 is not limited to such, and can be provided in response to a swipe gesture from the bottom edge of an application in full-screen mode or split-screen mode.

Figure 8A:
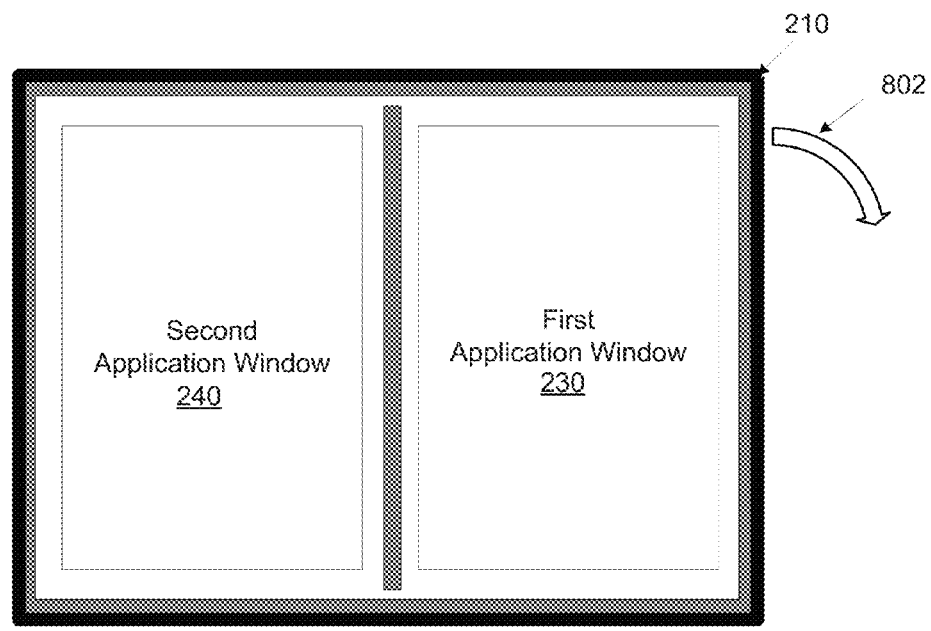
FIGS. 8A-8B are high-level diagrams illustrating an example of displaying two application windows concurrently based on device orientation, in accordance with one or more aspects of the subject technology.
Figure 8B:
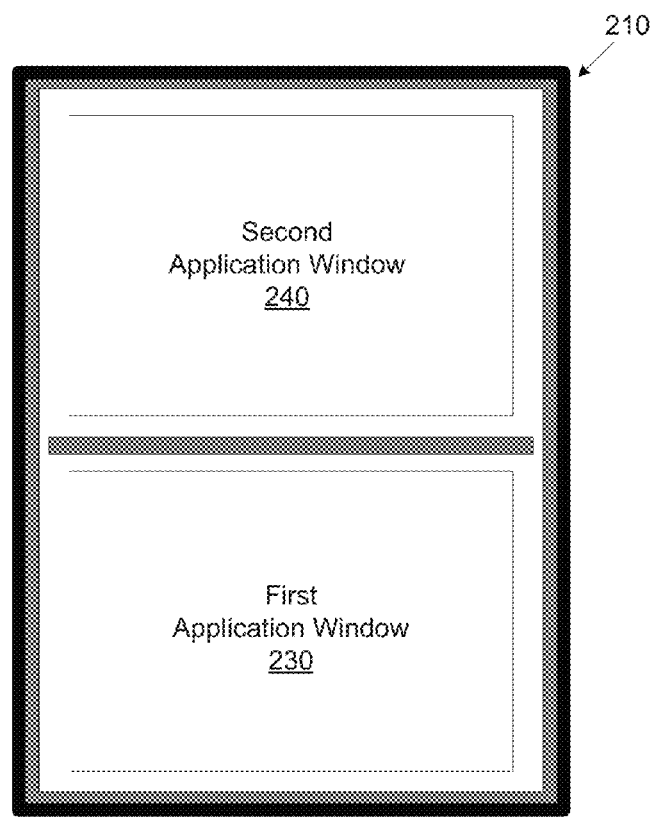

FIGS. 8A-8B are high-level diagrams illustrating an example of displaying two application windows concurrently based on device orientation, in accordance with one or more aspects of the subject technology. FIG. 8A shows the touchscreen 210 while concurrently displaying the first application window 230 and the second application window 240 side-by-side. In the example of FIG. 8A, computing device 100 is in a horizontal orientation. Processor 150 may instruct display module 130 to display the first and second windows in side-by-side configuration (e.g., second window on left and first window right), where each of the first and second windows are presented in a portrait view.

The user of computing device 100 may tilt computing device 100 and change its orientation. In this regard, orientation detection module 140, in conjunction with processor 150, identifies user input 802 associated with tilting computing device 100 from the horizontal orientation to a vertical orientation. In response to the identified tilting (e.g., user input 802), the processor 150 may instruct the display module 130 to change the configuration of the first and second windows. For example, the display module 130 may display the first and second windows 240 and 230 in a top and bottom configuration, for example, where the second window is on top since it was in the left position in FIG. 8A, and where first window is on bottom since it was in the right position in FIG. 8A. Each of the first and second windows can be presented in a landscape view when the computing device is in the vertical orientation.

While in the vertical orientation, the edge(s) for effecting cycling/toggling through active applications and for effecting the split-screen mode may be retained. For example, while the left and right edges in the horizontal orientation of the computing device 100 were used to effect cycling/toggling and split-screen capabilities, the top and bottom edges in the vertical orientation may be used to effect the same.

Further, while the above-described examples describe use of left and right edges for cycling, toggling and split-screen capabilities, and use of the bottom edge for displaying an overview of active applications while the device is in the horizontal orientation, the subject technology is not limited to such. Likewise, while the above-described examples describe use of top and bottom edges for cycling, toggling and split-screen capabilities, and use of a left or right edge for displaying an overview of active applications while the device is in the vertical orientation, the subject technology is not limited to such. Rather, different edges can be assigned or associated with different functionality in each of the horizontal and vertical orientations of computing device 100.

Figure 9:
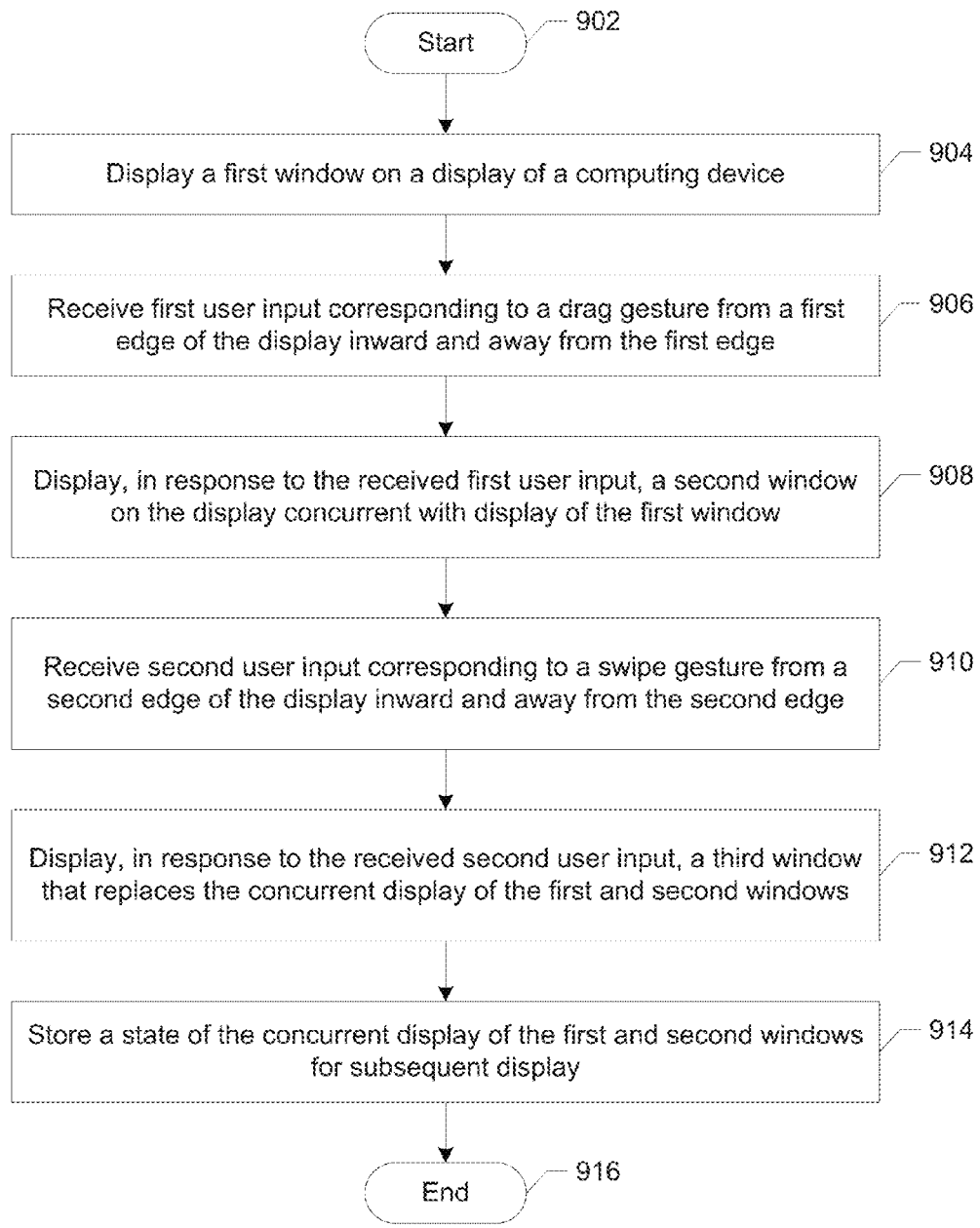
FIG. 9 illustrates an example process by which windows are displayed on a computing device.

FIG. 9 illustrates an example process by which windows are displayed on a computing device. Following start block 902, a first window is displayed on a display of the computing device at block 904.

At block 906, first user input is received, the first user input corresponding to a drag gesture from a first edge of the display inward and away from the first edge. At block 908, in response to the received first user input, a second window is displayed on the display concurrent with display of the first window. Displaying the second window on the display concurrent with display of the first window can comprise scaling content of the first window to fit within the first window for the concurrent display of the first and second windows, and scaling content of the second window to fit within the second window for the concurrent display of the first and second windows.

Displaying the second window on the display concurrent with display of the first window can comprise detecting that an orientation of the computing device is vertical, and displaying, in response to detecting the vertical orientation, the first and second windows in a top and bottom configuration, each of the first and second windows being displayed in a landscape view.

Alternatively or in addition, displaying the second window on the display concurrent with display of the first window can comprise detecting that an orientation of the computing device is horizontal, and displaying, in response to detecting the horizontal orientation, the first and second windows in a left and right configuration, each of the first and second windows being displayed in a portrait view.

At block 910, second user input is received, the second user input corresponding to a swipe gesture from a second edge of the display inward and away from the second edge. The first edge and the second edge can correspond to the same edge of the display. Alternatively, the first edge and the second edge can correspond to different edges of the display.

Each of the first edge and the second edge can correspond to a right edge or a left edge of the display. Third user input can be received, the third user input corresponding to a swipe gesture from a bottom edge of the display inward and away from the bottom edge. In response to the received third user input, an overview of active applications on the computing device can be displayed.

At block 912, in response to the received second user input, a third window is displayed that replaces the concurrent display of the first and second windows. At block 914, a state of the concurrent display of the first and second windows is stored, for subsequent concurrent display of the first and second windows.

Third user input can be received, the third user input corresponding to a swipe gesture from an edge opposite the second edge of the display inward and away from the opposite edge. In response to the received third user input and based on the stored state, the concurrent display of the first and second windows can be provided, wherein the concurrent display replaces the display of the third window.

Alternatively or in addition, a divider element can be displayed between the first window and the second window, and third user input can be received, the third user input corresponding to a drag gesture from the divider element towards the first edge or the second edge of the display.

Based on the received third user input, one of the first window or the second window can be removed from the concurrent display. In response to the removing, the state of the concurrent display may not (or may no longer) be stored for subsequent display. The process then ends at end block 916.

Figure 10:
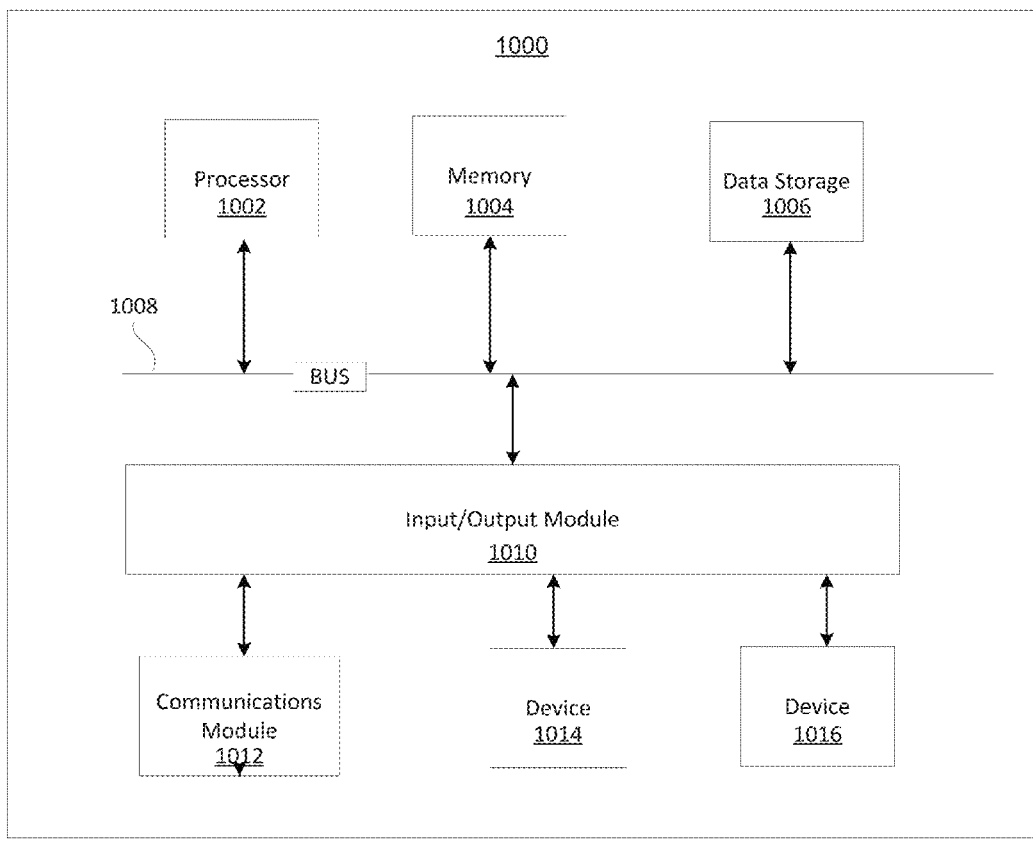
FIG. 10 is a block diagram illustrating an example computer system within which some implementations of the subject technology can be realized.

FIG. 10 is a block diagram illustrating an example computer system 1000 within which some implementations of the subject technology can be realized. In certain aspects, the computer system 1000 may be implemented using hardware or a combination of software and hardware, either in a dedicated server, or integrated into another entity, or distributed across multiple entities. The computer system 1000 (e.g., 100 of FIG. 1) includes a bus 1008 or other communication mechanism for communicating information, and a processor 1002 coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memory 160), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Examples of the input/output module 1010 include data ports such as USB ports. The input/output module 1010 is configured to connect to a communications module 1012. Examples of the communications modules 1012 include a network interface or networking interface cards, such as Ethernet cards and modems. In certain aspects, the input/output module 1010 is configured to connect to a plurality of devices, such as an input device 1014 and/or an output device 1016. Examples of the input devices 1014 include a touchscreen, a voice recognizing module, a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1016 include display devices, such as a LED (light emitting diode), CRT (cathode ray tube), or LCD (liquid crystal display) screen, for displaying information to the user.

According to one aspect of the present disclosure, the processor 1002 may execute one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

Computing system 1000 can include client devices and servers. A client device and a server are generally remote from each other and typically interact through a communication network. The relationship of client device and server arises by virtue of computer programs running on the respective computers and having a client-server relationship to each other.

The term "machine-readable storage medium" or "computer readable medium" as used herein refers to any medium or media that participates in providing instructions or data to processor 1002 for execution. Such a medium may take many forms, including, but not limited to, non-volatile media, volatile media, and transmission media. Non-volatile media include, for example, optical disks, magnetic disks, or flash memory, such as data storage device 1006. Volatile media include dynamic memory, such as memory 1004. Transmission media include coaxial cables, copper wire, and fiber optics, including the wires that comprise bus 1008. Common forms of machine-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It is to be understood that the disclosure is not to be limited to the disclosed embodiments but, on the contrary, is intended to cover various modifications and equivalent arrangements. Those of skill in the art would appreciate that the various illustrative blocks, modules, elements, components, methods, and algorithms described herein may be implemented as electronic hardware, computer software, or combinations of both. Skilled artisans may implement the described functionality in varying ways for each particular application. Various components and blocks may be arranged differently (e.g., arranged in a different order, or partitioned in a different way) all without departing from the scope of the subject technology.

The specific order or hierarchy of steps in the methods disclosed is an illustration of examples of approaches. The specific order or hierarchy of steps in the methods may be rearranged, e.g., based on design preferences. Some of the steps may be performed simultaneously or in an alternative order. Other embodiments are also within the scope of the following claims.

What is claimed is:

1. A computer-implemented method for displaying windows on a computing device, the method comprising:
    displaying a first window on a display of a computing device;
    receiving first user input corresponding to a drag gesture from a first edge of the display inward and away from the first edge;
    displaying, in response to the received first user input, a second window on the display concurrent with display of the first window;
    receiving second user input corresponding to a swipe gesture from a second edge of the display inward and away from the second edge;
    displaying, in response to the received second user input, a third window that replaces the concurrent display of the first and second windows; and
    storing a state of the concurrent display of the first and second windows for subsequent display.

2. The computer-implemented method of claim 1, further comprising:
    receiving third user input corresponding to a swipe gesture from an edge opposite the second edge of the display inward and away from the opposite edge; and
    providing, in response to the received third user input and based on the stored state, for the concurrent display of the first and second windows, wherein the concurrent display replaces the display of the third window.

3. The computer-implemented method of claim 1, wherein displaying the second window on the display concurrent with display of the first window comprises:
  scaling content of the first window to fit within the first window, for the concurrent display of the first and second windows; and
  scaling content of the second window to fit within the second window, for the concurrent display of the first and second windows.

4. The computer-implemented method of claim 1, wherein the first edge and the second edge correspond to the same edge of the display.

5. The computer-implemented method of claim 1, wherein the first edge and the second edge correspond to different edges of the display.

6. The computer-implemented method of claim 1, wherein each of the first edge and the second edge corresponds to a right edge or a left edge of the display.

7. The computer-implemented method of claim 6, further comprising:
  receiving third user input corresponding to a swipe gesture from a bottom edge of the display inward and away from the bottom edge; and
  displaying, in response to the received third user input, an overview of active applications on the computing device.

8. The computer-implemented method of claim 1, wherein displaying the second window on the display concurrent with display of the first window comprises:
  detecting that an orientation of the computing device is vertical; and
  displaying, in response to detecting the vertical orientation, the first and second windows in a top and bottom configuration, each of the first and second windows being displayed in a landscape view.

9. The computer-implemented method of claim 1, wherein displaying the second window on the display concurrent with display of the first window comprises:
  detecting that an orientation of the computing device is horizontal; and
  displaying, in response to detecting the horizontal orientation, the first and second windows in a left and right configuration, each of the first and second windows being displayed in a portrait view.

10. The computer-implemented method of claim 1, further comprising:
  displaying a divider element between the first window and the second window;
  receiving third user input corresponding to a drag gesture from the divider element towards the first edge or the second edge of the display;
  removing, based on the received third user input, one of the first window or the second window from the concurrent display; and
  providing, in response to the removing, for the state of the concurrent display to not be stored for subsequent display.

11. A computing device for displaying windows within a user interface, the computing device comprising:
  a display;
  one or more processors;
  a machine-readable medium comprising instructions stored therein, which when executed by the processors, cause the processors to perform operations comprising:
    displaying a first window on the display of the computing device;
    receiving first user input corresponding to a drag gesture from a first edge of the display inward and away from the first edge;
    displaying, in response to the received first user input, a second window on the display concurrent with display of the first window;
    receiving second user input corresponding to a swipe gesture from a second edge of the display inward and away from the second edge;
    displaying, in response to the received second user input, a third window that replaces the concurrent display of the first and second windows;
    storing a state of the concurrent display of the first and second windows for subsequent display;
    receiving third user input corresponding to a swipe gesture from an edge opposite the second edge of the display inward and away from the opposite edge; and
    providing, in response to the received third user input and based on the stored state, for the concurrent display of the first and second windows, wherein the concurrent display replaces the display of the third window.

12. The computing device of claim 11, wherein displaying the second window on the display concurrent with display of the first window comprises:
  scaling content of the first window to fit within the first window, for the concurrent display of the first and second windows; and
  scaling content of the second window to fit within the second window, for the concurrent display of the first and second windows.

13. The computing device of claim 11, wherein each of the first edge and the second edge corresponds to a right edge or a left edge of the display.

14. The computing device of claim 13, the operations further comprising:
  receiving third user input corresponding to a swipe gesture from a bottom edge of the display inward and away from the bottom edge; and
  displaying, in response to the received third user input, an overview of active applications on the computing device.

15. The computing device of claim 11, wherein displaying the second window on the display concurrent with display of the first window comprises:
  detecting that an orientation of the computing device is vertical; and
  displaying, in response to detecting the vertical orientation, the first and second windows in a top and bottom configuration, each of the first and second windows being displayed in a landscape view.

16. The computing device of claim 11, wherein displaying the second window on the display concurrent with display of the first window comprises:
  detecting that an orientation of the computing device is horizontal; and
  displaying, in response to detecting the horizontal orientation, the first and second windows in a left and right configuration, each of the first and second windows being displayed in a portrait view.

17. A non-transitory machine-readable medium comprising instructions stored therein, which when executed by a system, cause the system to perform operations comprising:
  displaying a first window on a display of a computing device;

receiving first user input corresponding to a drag gesture from a first edge of the display inward and away from the first edge;

displaying, in response to the received first user input, a second window on the display concurrent with display of the first window;

receiving second user input corresponding to a swipe gesture from a second edge of the display inward and away from the second edge;

displaying, in response to the received second user input, a third window that replaces the concurrent display of the first and second windows;

receiving third user input corresponding to a swipe gesture from the second edge of the display inward and away from the second edge; and providing, in response to the received third user input, for the concurrent display of the first and second windows, wherein the concurrent display replaces the display of the third window.

18. The non-transitory machine-readable medium of claim 17, wherein displaying the second window on the display concurrent with display of the first window comprises:

scaling content of the first window to fit within the first window, for the concurrent display of the first and second windows; and scaling content of the second window to fit within the second window, for the concurrent display of the first and second windows.

19. The non-transitory machine-readable medium of claim 17, wherein each of the first edge and the second edge corresponds to a right edge or a left edge of the display.

20. The non-transitory machine-readable medium of claim 19, the operations further comprising:

receiving third user input corresponding to a swipe gesture from a bottom edge of the display inward and away from the bottom edge; and displaying, in response to the received third user input, an overview of active applications on the computing device.

* * * * *